June 30, 1964 F. F. JOHNSON 3,139,528
NEUTRON-GAMMA RAY WELL LOGGING DEVICE FOR DISTINGUISHING
BETWEEN SHALE AND SANDSTONE
Filed April 10, 1959 2 Sheets-Sheet 2

INVENTOR.
FRANK F. JOHNSON

BY
Brumbaugh, Free, Graves & Donohue
his ATTORNEYS

United States Patent Office 3,139,528
Patented June 30, 1964

3,139,528
NEUTRON-GAMMA RAY WELL LOGGING DEVICE FOR DISTINGUISHING BETWEEN SHALE AND SANDSTONE
Frank Fawcett Johnson, Granite Springs, N.Y., assignor to Schlumberger Well Surveying Corporation, Houston, Tex., a corporation of Delaware
Filed Apr. 10, 1959, Ser. No. 805,447
8 Claims. (Cl. 250—83.3)

This invention relates to nuclear well logging and, more particularly, to a new and improved system for distinguishing different types of well formations.

In the logging of wells or boreholes, it is often important to determine the types of formations through which the borehole passes. Various devices, such as electrical and radioactivity well logging instruments have been used in the past for this purpose but the exacting requirements of geophysical interpretation make it necessary to obtain more detailed information concerning the nature and contents of earth formations than has been possible heretofore.

Accordingly, it is an object of this invention to provide a new and improved system for determining the character of formations through which a borehole passes.

Another object of the invention is to provide a new and improved system for distinguishing various borehole formations according to the presence and relative abundance of various elements.

A further object of the invention is to provide a system for detecting shale formations in a borehole and distinguishing them from sandstone formations for example.

These and other objects of the invention are attained by irradiating borehole formations with neutrons and measuring the intensity of gamma rays characteristic of neutron capture by nuclei of an element which is more abundant in one type of formation to be distinguished than in the other. The intensity of gamma rays characteristic of neutron capture by nuclei of another element present in greater proportion in the other type of formation is also measured and compared with the first measurement. Apparatus for carrying out the invention comprises an instrument arranged to be lowered into a borehole and including a neutron source and a detector capable of detecting gamma rays of different energy and generating corresponding electrical signals. An analyzer selects signals from the detector representing gamma rays characteristic of neutron capture by selected elements in each of the formations under consideration and transmits signals indicating the intensities of the gamma rays from each of the formations to comparing apparatus.

Figure 1:
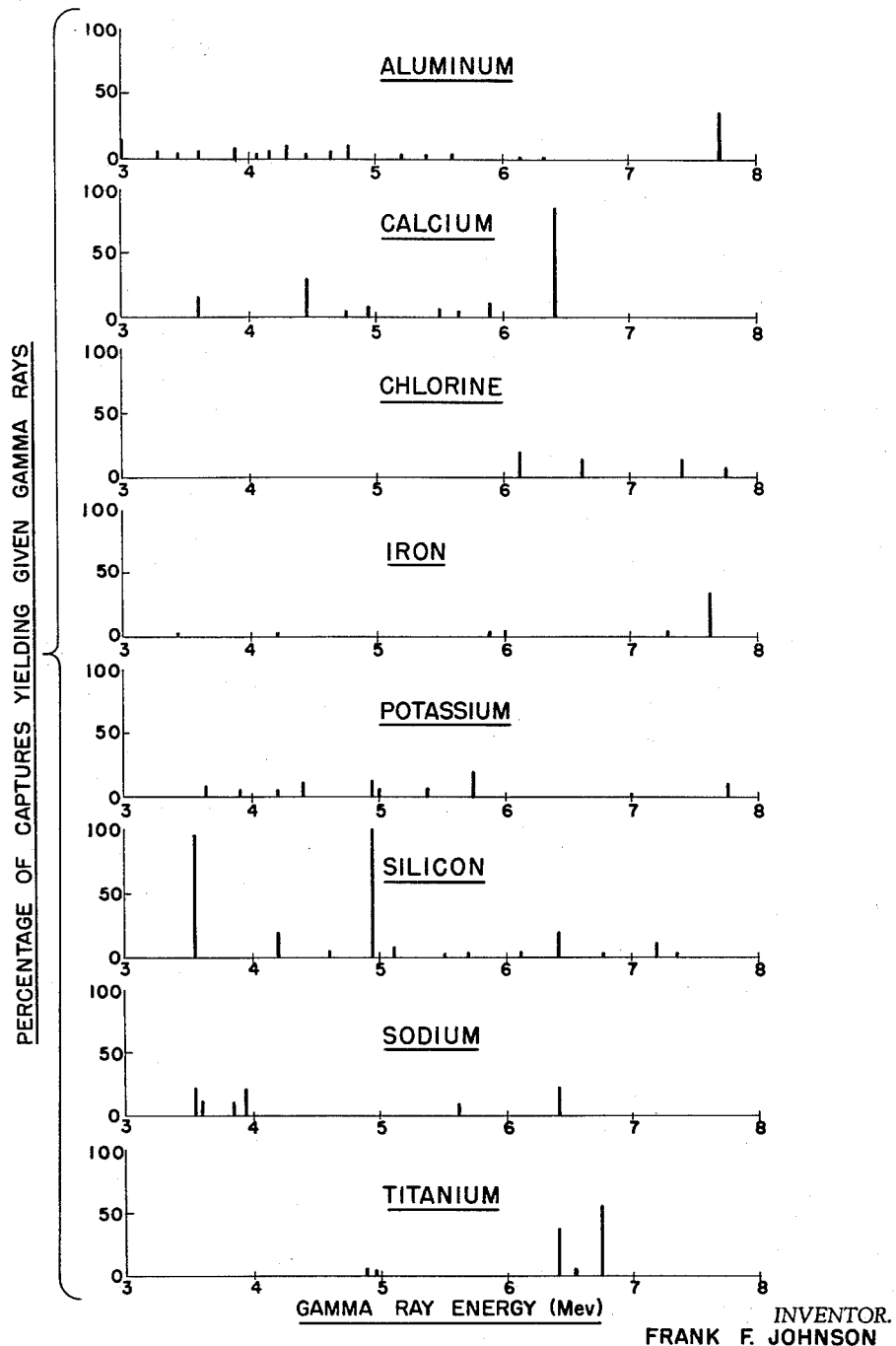
Figure 2:
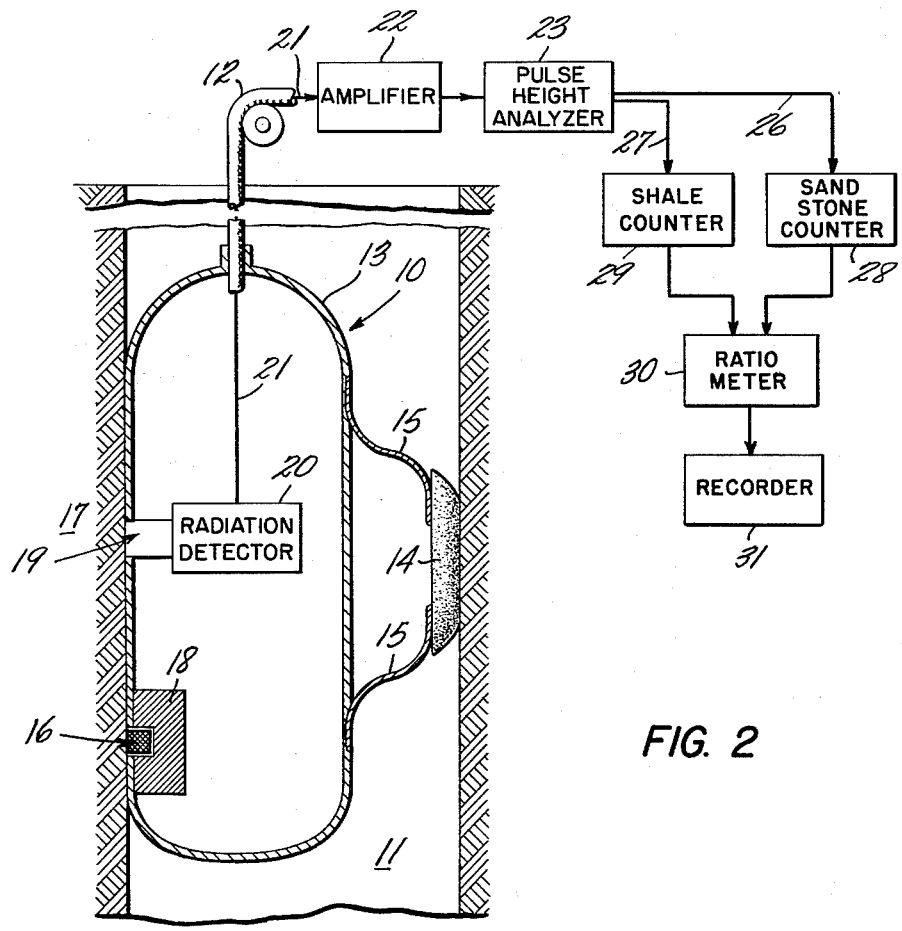

Further objects and advantages of the invention will be apparent from a reading of the following description in conjunction with the accompanying drawings in which:

FIG. 1 is a graphical representation showing the percentage of neutron captures yielding gamma rays of various energies for elements common to rock formations; and FIG. 2 is a schematic block diagram illustrating a typical apparatus for carrying out the invention.

As a typical example, the invention will be described hereinafter with reference to the determination of shale formations as distinguished from sandstone formations in a borehole. It will be understood, however, that the invention may be utilized in distinguishing any types of formations wherein certain elements respond to neutron capture to emit gamma rays of characteristic energy in intensities representative of their concentration.

When exposed to slow, or thermal, neutrons, the nuclei of most elements capture neutrons and form compound nuclei having atomic weight one unit greater than that of the original nuclei. The probability that a thermal neutron will be captured by a nucleus of a given element in a sample is proportional to the concentration of the element in the sample, the concentration of thermal neutrons in the sample, and the thermal neutron capture cross-section which is a property of the element and varies from one element to another.

Capture of a thermal neutron by a nucleus in this manner increases the energy of the new compound nucleus by an amount equal to the binding energy of the neutron and, in order to return to a stable state, the excited compound nucleus usually emits one or more gamma rays, known as neutron capture gamma rays, the energy carried away by these gamma rays being equal to the excitation energy. Inasmuch as the neutron binding energy in the compound nucleus is a specific value for each element or isotope and the manner of deexcitation is also specific, the neutron capture gamma rays emitted constitute a characteristic energy spectrum for each element. This spectrum consists of a number of gamma ray photons having specific energies, the relative numbers being dependent on the relative probability of emission at each energy.

In the graphical representation of FIG. 1, the characteristic energy spectrum of neutron capture gamma rays for a number of elements common to various rock formations is shown with the ordinate representing the percentage of neutron captures yielding given gamma rays and the abscissa indicating the energies of the various gamma rays in mev. From an examination of FIG. 1, it can be seen, for example, that about 16% and 30% of the neutron captures by calcium nuclei result in emission of a gamma ray at about 3.6 and 4.45 mev., respectively, while about 35% of neutron captures by aluminum nuclei produce a 7.73 mev. gamma ray. Similarly, every neutron capture by a silicon nucleus yields a 4.95 mev. gamma ray and about 95% of these captures lead to a gamma ray of about 3.57 mev., while for iron a capture gamma ray of about 7.63 is obtained. It should also be noted that some of the elements may emit gamma rays in response to capture of, or in elastic collision with, fast neutrons. However, the neutron capture cross-section of all the elements under consideration is substantially lower for high energy than thermal neutrons and, for this reason, the preferred embodiment of the invention is directed to thermal neutron capture reactions.

In the following table, the relative number of atoms or concentration of each constituent element of an average shale formation is given, along with thermal neutron capture cross-section and the product of the cross-section with the relative number of atoms. In addition, the percentage of the total of cross-section-concentration products which each element contributes is shown, indicating the likelihood of neutron capture by nuclei of that element in a shale formation.

TABLE I

*Thermal Neutron Capture Properties of Average Shale*

| Element | N=relative No. of atoms | $\sigma_0$=capture cross-section | $N\sigma_0$ | Percent of $\Sigma N\sigma_0$ |
|---|---|---|---|---|
| Al | 9.7 | .215 | 2.1 | 8 |
| C | 1.9 | .0032 | .009 | |
| Ca | 1.8 | .43 | .79 | 3 |
| Fe | 2.7 | 2.43 | 6.6 | 25 |
| H | 19 | .33 | 6.3 | 24 |
| K | 2.2 | 1.97 | 4.3 | 16 |
| Mg | 2 | .063 | .012 | |
| Na | 1.4 | .5 | .7 | 3 |
| O | 100 | 0 | 0 | |
| P | .1 | .19 | .019 | |
| S | .3 | .49 | .15 | 1 |
| Si | 31 | .13 | 4 | 15 |
| Ti | .3 | 5.6 | 1.7 | 6 |

In Table II, the corresponding data for the same elements are given for a typical sandstone formation.

TABLE II

*Nuclear Properties of Average Sandstone*

| Element | N=relative No. of atoms | $\sigma_c$=capture cross-section | $N\sigma_c$ | Percent of $\Sigma N\sigma_c$ |
|---|---|---|---|---|
| Al | 2.89 | .215 | .62 | 4.9 |
| C | 3.5 | .0032 | .016 | .1 |
| Ca | 3.02 | .43 | 1.3 | 10.2 |
| Fe | .54 | 2.43 | 1.3 | 10.2 |
| H | 5.5 | .33 | 1.8 | 14.1 |
| K | .86 | 1.97 | 1.7 | 13.3 |
| Mg | .89 | .063 | .006 | |
| Na | .44 | .5 | .22 | 1.7 |
| O | 100 | 0 | 0 | |
| P | .04 | .19 | .0076 | |
| S | .03 | .49 | .015 | .1 |
| Si | 40 | .13 | 5.2 | 40.7 |
| Ti | .10 | 5.6 | .56 | 4.4 |

By comparing the percentages given in these tables indicating the probability of neutron capture by various elements in each formation and referring to FIG. 1, certain elements can be selected which have relatively high concentration in one of the formations and low concentration in the other and also emit one or more characteristic neutron capture gamma rays which dominate a particular portion of the energy spectrum. As an example of elements which can be selected, the relative numbers of atoms of aluminum and iron are about twice as high in shale as in sandstone, as indicated in the tables, and these elements emit dominant neutron capture gamma rays in the 7.5 to 8.0 mev. region. Also, gamma rays emitted by calcium and silicon are each about three times as abundant in sandstone and produce significant photopeaks at 3.57, 3.6, 4.45 and 4.95 mev. It will be noted that each of the other constituents of sandstone and shale formations emitting neutron capture gamma rays in the vicinity of these energies occurs in substantially lower proportion in the formations than aluminum, iron, calicum, and silicon and that the probability of emission of these gamma rays is also substantially lower.

Although chlorine is not a constituent element of either of these formations, it may be present in salt water contained in one or the other formation in a borehole and for this reason its characteristic gamma ray energy spectrum, as shown in FIG. 1, should be considered in selecting gamma rays in the above manner. Similarly, the characteristic gamma ray spectra of any other elements which may be present while logging a borehole formation should also be taken into account. Furthermore, hydrogen, which is a principal constituent of both formations, is eliminated from consideration when dealing with the range of energies specified in the present example since it does not emit any substantial amount of gamma radiation above 2.2 mev.

In accordance with these observations, shale and sandstone formations can be distinguished by irradiating the formations with neutrons and detecting the intensity of gamma radiation at any or all of the 3.57, 3.6, 4.45 and 4.95 mev. energy levels and comparing it with the intensity of gamma radiation in the range 7.5 to 8.0 mev. as by taking the ratio between the two. Thus, a high ratio of 7.5 to 8.0 mev. gamma radiation to 3.57, 3.6, 4.45 or 4.95 mev. radiation indicates a high iron or aluminum content with respect to the silicon or calcium content and, therefore, identifies the formation as shale, while a low ratio indicates that the formation is sandstone.

It will be understood that the gamma ray energy distributions shown in the graphical illustrations of FIG. 1 represent the primary spectra produced at the position of the excited compound nuclei in response to capture of neutrons. As a practical matter, however, these gamma rays in passing through adjacent formations are degraded by Compton scatterings which reduce the energy of some of the rays before they are detected. Consequently, the actual spectrum received at a detector spaced from the source includes a decreased number of primary gamma rays at the indicated energies and additional rays having lower energies. It can be shown, however, that for gamma ray energies greater than about 2.5 mev. passing through the usual formations encountered in a borehole, the actual gamma ray spectrum at the position of a detector includes three to four times as many primary rays as degraded rays and, therefore, the intensities of the primary rays are useful in indicating the presence of corresponding elements.

Furthermore, in practice, the radiation spectrum produced by a detector includes the usual background radiation at all energies resulting from incidence of fast neutrons on the detector, simultaneous occurrence, or pile-up, of lower energy radiations, degradation of higher energy radiations, and the like. However, inasmuch as these effects are generally independent of the type of formation irradiated with neutrons, they are relatively constant and do not affect the differences in gamma ray spectra produced by various types of formations.

For a number of practical reasons, it is usually desirable to compare the intensity of gamma rays within one fairly broad energy range with the intensity of gamma rays in another fairly broad range, each range being representative of one of the formations, rather than merely selecting the intensities at specific energy levels for comparison. For example, if a conventional crystal-type scintillation detector is used to detect gamma rays, the output signals for gamma rays at each specific energy will be spread over a fairly broad range, equivalent to one mev. or more, rather than being limited to the specific energy. Particularly is this true where the response is primarily due to pair production, for which peaks occur approximately 0.5 and 1.0 mev. below the photopeaks shown in FIG. 1. Furthermore, neutron capture gamma rays from other elements having higher concentration in the same formation which, although less dominant in the gamma ray spectrum, affect the ratio favorably, may occur at energies between or beyond those of the dominant gamma rays selected in the above manner. Accordingly, the intensity of the titanium gamma ray at 6.75 mev. shown in FIG. 1 could be included with the iron and aluminum gamma rays at 7.7 mev. in determining shale since titanium is more abundant in shale than in sandstone. On the other hand, the range corresponding to each type of formation should be limited or broken up into sections to exclude neutron capture gamma rays from elements primarily present in the other type of formation.

Therefore, in the typical case described herein, the intensity of gamma rays having energy in the range from 3.0 to 4.9 mev. is compared with the intensity in the range from 6.2 to 8.0 mev. to distinguish between shale and sandstone. However, if dominant neutron capture gamma rays were produced having peaks at 3.6 and 4.7 mev., for example, by elements included in another type of formation to be distinguished from sandstone, the sum of the gamma ray pair-peak intensities in the ranges 3.0 to 3.5 and 3.9 to 4.4 mev. could be compared with the sum of the intensities in the ranges 3.5 to 3.9 and 4.4 to 4.9 mev. to provide an indication of the content of the other elements with respect to silicon and calcium.

As illustrated in FIG. 2, typical apparatus for carrying out the invention comprises a borehole instrument 10 adapted to be lowered into a borehole 11 at the end of a cable 12 in the usual manner, the instrument 10 being encased in a pressure housing 13. Unless iron is a constituent element having a higher concentration in one of the types of formations to be distinguished, the housing 13 may be steel. However, if neutron capture gamma rays from iron are to be detected and utilized in the comparison, the housing 13 and other components of the instrument 10 may be made of any other suitable material, such as Pyrex or Fiberglas made from Pyrex, for example. The borehole instrument 10 may be centered or freely suspended in the borehole. For use in relatively large diameter boreholes, preferably the instrument is held in contact with the borehole wall at one side of the borehole 11 in any well known manner such as by a pad member 14 urged against the opposite side of the borehole wall by springs 15.

Within the instrument 10, a neutron source 16 may be positioned centrally or, as illustrated, at the side of the housing 13 which is in contact with the borehole wall to irradiate the adjacent formation 17 with neutrons, the source 16 being contained within an appropriate shielding material 18. Preferably, because of its low gamma ray emission, the source 16 comprises a conventional polonium-beryllium source of about five curies strength, for example, but any other suitable neutron source can be substituted. For example, a pulsed neutron source of the type described in the copending United States application of Goodman, Serial No. 441,976, now U.S. Patent No. 2,991,364, might be utilized. By timing the operation of the detecting apparatus described hereinafter with respect to the neutron pulse to render it sensitive only after most of the neutrons in a pulse have slowed down to thermal energy, a large part of the background radiation produced by fast neutron capture, inelastic collision, or incidence of a fast neutron on the detector can be eliminated with a pulse source of this type.

At a position longitudinally spaced from the neutron source 16, the sensitive element 19 of a radiation detector 20 is mounted in the housing adjacent the wall of the borehole 11 to receive gamma rays from the formation 17. This detector may be of any well known type responsive to gamma rays to produce a pulse signal in response to each gamma ray detected having an amplitude representative of the energy of the gamma rays. For example, it may comprise a conventional scintillation spectrometer utilizing a sodium iodide crystal as the gamma ray sensitive element 19 and also a photomultiplier tube positioned to detect each flash of light in the crystal resulting from incidence of the gamma rays and to generate a pulse corresponding thereto.

In order to prevent actuation of the detector by slow neutrons from the source 16, the sensitive element 19 is preferably encased in a boron carbide sheath. Moreover, if the housing 13 is made of iron or steel, it may be coated with a boron or lithium compound to reduce capture gamma rays from iron or nickel nuclei. If desired, the detector 20 may also include suitable equipment for amplifying each pulse but it will be appreciated that amplification at this stage must be accomplished with high amplitude fidelity. Also, in order to reduce the counting rate capacity required of subsequent equipment, the detector can be arranged in the usual manner to respond only to pulses corresponding to gamma rays having energy greater than a predetermined value, for example, 2.5 mev.

Output pulses from the detector 20 are transmitted by a conductor 21 through the cable 12 to the surface of the earth where they may be amplified by an amplifier 22 if desired. However, as pointed out above, high amplitude fidelity must be maintained at this stage. The output pulses are applied to a conventional pulse height analyzer 23 which is arranged to select the pulses corresponding to the gamma ray energy ranges representing the types of formation under consideration and apply these to two channel conductors 26 and 27, respectively. Thus, if the ranges selected are 3.0 to 4.9 mev., corresponding to neutron capture by elements predominant in sandstone formations, and 6.2 to 8.0 mev., corresponding to neutron capture by elements present in higher proportion in shale formations, as described above, the pulse height analyzer 23 selects electrical pulses representing gamma rays having pair-peaks within the 3.0 to 4.9 mev. energy range and transmits them through the conductor 26 to a sandstone pulse counter 28 while applying pulses representing pair-peaks in the 6.2 to 8.0 mev. range through the conductor 27 to a shale pulse counter 29.

If sandstone is to be distinguished from another formation having elements emitting characteristic gamma rays with pair-peaks at 3.6 and 4.7 mev., as in the example described above, the pulse height analyzer is arranged to select pulses representing gamma rays having energy in the ranges 3.0 to 3.5 and 3.9 to 5.4 mev. and transmit them through the conductor 26 to the sandstone counter 28 while selecting pulses in the ranges 3.5 to 3.9 and 4.4 to 4.9 mev. for transmission to the other counter 29. In this manner, the intensities of neutron capture gamma rays from elements preponderant in each of the formations are combined and distinguished from those of the other formation.

Each of the counters 28 and 29 may be of the cumulative type resettable at unit time intervals and adapted to accumulate the number of pulses received in each time interval and to provide an output signal representing the total at the end of the time interval. On the other hand, conventional counting rate meters comprising, for example, storage capacitors shunted by bleeder resistors to provide a constant rate of decay may be utilized to generate a continuous output voltage representing the rate of receipt of input pulses.

Output signals from both of the counters 28 and 29 are transmitted to a comparing device, such as a ratio meter 30 of any well known type arranged to generate an output signal representative of the ratio between the signals from the counters 28 and 29. In order to provide a continuous formation log of a borehole, this signal is transmitted to a conventional recorder 31 linked to drive apparatus (not shown) for the cable 12 to move a record medium in correspondence with instrument depth, thereby producing a record indicating the type of formation present at various levels in the borehole 11.

In operation, the formation 17 is irradiated with neutrons from the source 16 while the instrument 10 is moved through the borehole 11. Gamma rays of various energies, including neutron capture gamma rays from aluminum, iron, silicon, calcium, or other selected elements in the formation, actuate the detector 20 to transmit pulse signals on the conductor 21 having amplitudes corresponding to those energies. The pulses representing gamma ray pair-peaks within an energy range related to sandstone formations, for example, 3.0 to 4.9 mev., are selected by the pulse height analyzer 23 and transmitted through the channel 26 to actuate the counter 28. At the same time, pulses in a pair-peak energy range corresponding to shale formations, such as 6.2 to 8.0 mev., are applied through the channel 27 to the counter 29. The ratio meter 30 computes the ratio of the rate of receipt of these pulses, thereby indicating the relative intensities of gamma rays in the corresponding energy ranges and providing an indication of the type of formation present in the borehole.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A method for determining the type of formation through which a borehole passes comprising irradiating the formation with neutrons, detecting gamma rays from the formation and generating corresponding electrical signals representing the energies of the detected gamma rays, measuring the intensity of signals corresponding to gamma rays resulting from neutron capture by nuclei of a first element having higher concentration in one type of formation than in others, measuring the intensity of signals corresponding to gamma rays resulting from neutron capture by nuclei of another element, chemically different from the first element, having lower concentration in that type of formation than in other types of formations, and comparing the two intensities.

2. A method for distinguishing between two types of formations through which a borehole passes comprising irradiating the formations with neutrons, detecting gamma rays from the formations and generating corresponding electrical signals representing the energies of the detected gamma rays, measuring the intensity of signals corresponding to gamma rays resulting from neutron capture by nuclei of a first element having higher concentration in one type of formation than in the other, measuring the intensity of signals corresponding to gamma rays resulting from neutron capture by nuclei of another element, chemically different from the first element, having higher concentration in the other type of formation, and comparing the two intensities.

3. A method for distinguishing between two types of formations through which a borehole passes comprising irradiating the formations with neutrons, detecting gamma rays from the formations and generating corresponding electrical signals representing the energies of the detected gamma rays, measuring the intensity of signals corresponding to gamma rays in a first energy range including characteristic gamma rays resulting from neutron capture by nuclei of at least one first element having higher concentration in one type of formation than in the other, measuring the intensity of signals corresponding to gamma rays in a second energy range including characteristic gamma rays resulting from neutron capture by nuclei of at least one other element, chemically different from the first element, having higher concentration in the other formation, and comparing the two intensities.

4. A method for distinguishing between two types of formations through which a borehole passes comprising irradiating the formations with neutrons, detecting gamma rays from the formations and generating corresponding electrical signals representing the energies of the detected gamma rays, measuring the intensity of signals corresponding to gamma rays in a first energy range including a plurality of characteristic gamma rays resulting from neutron capture by nuclei of at least one first element having higher concentration in one type of formation than in the other, measuring the intensity of signals corresponding to gamma rays in a second energy range including a plurality of characteristic gamma rays resulting from neutron capture by nuclei of at least one other element, chemically different from the first element, having higher concentration in the other type of formation, and comparing the two intensities.

5. A method for distinguishing between two types of formations through which a borehole passes comprising irradiating the formations with neutrons, detecting gamma rays from the formations and generating corresponding electrical signals representing the energies of the detected gamma rays, measuring the intensity of signals corresponding to gamma rays in at least one energy range including at least one characteristic gamma ray resulting from neutron capture by nuclei of a first element having higher concentration in one type of formation than in the other, measuring the intensity of signals corresponding to gamma rays in at least one other energy range including at least one characteristic gamma ray resulting from neutron capture by nuclei of another element, chemically different from the first element, having higher concentration in the other type of formation, and comparing the two intensities.

6. A method for distinguishing between two types of formations through which a borehole passes comprising irradiating the formations with neutrons, detecting gamma rays from the formations and generating corresponding electrical signals representing the energies of the detected gamma rays, measuring the intensity of signals corresponding to gamma rays in at least one energy range including at least a first characteristic gamma ray resulting from neutron capture by nuclei of a first element having higher concentration in one type of formation than in the other, which first characteristic gamma ray has a higher probability of emission than characteristic gamma rays in the same energy range from elements in the other formation, measuring the intensity of signals corresponding to gamma rays in at least one other energy range including at least a second characteristic gamma ray resulting from neutron capture by nuclei of another element, chemically different from the first element, having higher concentration in the other type of formation, which second characteristic gamma ray has a higher probability of emission than characteristic gamma rays in the same energy range from elements in the first formation, and comparing the two intensities.

7. A method for distinguishing between shale and sandstone formations through which a borehole passes comprising irradiating the borehole formations with neutrons, detecting gamma rays from the formation and generating corresponding electrical signals representing the energies of the detected gamma rays, measuring the intensity of signals corresponding to gamma rays resulting from neutron capture by nuclei of silicon, measuring the intensity of signals corresponding to gamma rays resulting from neutron capture by nuclei of iron, and comparing the two intensities.

8. A method for distinguishing between shale and sandstone formations through which a borehole passes comprising irradiating the borehole formations with neutrons, detecting gamma rays from the formation and generating corresponding electrical signals representing the energies of the detected gamma rays, measuring the intensity of signals corresponding to gamma rays having pair-peaks in an energy range from 3.0 to 4.9 mev., measuring the intensity of signals corresponding to gamma rays having pair-peaks in an energy range from 6.2 to 8.0 mev., and comparing the two intensities.

References Cited in the file of this patent

UNITED STATES PATENTS

| | | |
|---|---|---|
| Re. 24,226 | Fearon | Oct. 9, 1956 |
| Re. 24,383 | McKay | Oct. 29, 1957 |
| 2,712,081 | Fearon et al. | June 28, 1955 |
| 2,769,096 | Frey | Oct. 30, 1956 |
| 2,862,106 | Scherbatskoy | Nov. 25, 1958 |
| 2,905,826 | Bonner | Sept. 22, 1959 |
| 2,910,591 | Baker | Oct. 27, 1959 |
| 2,922,886 | Putnam | Jan. 26, 1960 |
| 2,943,200 | Rickard | June 28, 1960 |